United States Patent
Roske

[11] Patent Number: 6,139,464
[45] Date of Patent: Oct. 31, 2000

[54] INDIVIDUAL WHEEL DRIVE WITH A PLANETARY GEAR

[75] Inventor: Michael Roske, Friedrichshafen, Germany

[73] Assignee: ZF Friedrichshafen AG, Friedrichshafen, Germany

[21] Appl. No.: 09/366,908

[22] Filed: Aug. 4, 1999

Related U.S. Application Data

[63] Continuation-in-part of application No. 09/004,874, Jan. 9, 1998.

[30] Foreign Application Priority Data

Mar. 8, 1997 [DE] Germany ............................ 197 09 577

[51] Int. Cl.[7] ............................. F16H 57/08; B60K 1/00
[52] U.S. Cl. ......................... 475/331; 475/343; 180/65.6
[58] Field of Search ..................................... 475/331, 343, 475/152, 151; 180/65.5, 65.6

[56] References Cited

U.S. PATENT DOCUMENTS

| | | | |
|---|---|---|---|
| 4,170,150 | 10/1979 | Selbach et al. ............................ 74/410 |
| 4,437,530 | 3/1984 | De Young et al. ........................ 180/75 |
| 4,843,910 | 7/1989 | Loeber et al. ............................. 475/343 |
| 5,472,059 | 12/1995 | Schlosser et al. ...................... 180/65.5 |
| 5,691,584 | 11/1997 | Toida et al. ......................... 180/65.5 X |
| 5,769,751 | 6/1998 | Forster .................................... 475/346 |
| 5,924,506 | 7/1999 | Perego .............................. 180/65.5 X |
| 6,006,870 | 12/1999 | Gazyakan et al. .................. 475/331 X |

FOREIGN PATENT DOCUMENTS 21 09 372  9/1972  Germany .
26 30 206 C2  3/1978  Germany .

*Primary Examiner*—Charles A Marmor
*Assistant Examiner*—Roger Pang
*Attorney, Agent, or Firm*—Davis and Bujold

[57] ABSTRACT

The invention concerns an individual wheel drive with a rear-mounted planetary gear (3) for motor vehicles. A prime mover (1) or a bunched up input from several engines produces the input power. In order to design optimally the needed space for the individual wheel drive, the shaft of the prime mover or of the bunched up input is offset relative to the wheel axle. Said axle offset (20) is again compensated in the planetary gear (3) by shifting against each other the axles of the sun gear (14) and of the planet carrier (16) which drive the wheel hub (5).

11 Claims, 5 Drawing Sheets

INDIVIDUAL WHEEL DRIVE WITH A PLANETARY GEAR

This is a continuation-in-part application Ser. No. 09/004,874 filed Jan. 9, 1998.

The invention concerns an individual wheel drive with a rear-mounted planetary gear for motor vehicles. Individual wheel drives with rear-mounted planetary gear are known already, an example of such an individual wheel drive being given in German Patent No. 26 30 206.

Those individual wheel drives with a rear-mounted planetary gear can be used, for example, in short-distance buses. Since, in this transmission system, the otherwise usual axle-beam housing for an axle input and a differential are eliminated, it is possible to build buses with a very low floor level. In the former, driving drafts for low-floor buses with individual wheel drives, the size of the prime mover and of the actuating devices for the brake are disadvantageous since they make large wheel wells necessary and narrow down the passage into the floor of the bus to the height of the wheels. For optimally building the body of a vehicle in accordance with the work space, it can prove necessary to fit the primary mover or a bunched up transmission system of several engines offset relative to the wheel axle.

The problem on which the invention is based is to provide an individual wheel drive with a rear-mounted planetary gear which, as a result of the drive unit being fitted offset relative to the wheel axle, makes an optimal use of the interior of the vehicle possible and in which said axle offset is compensated in the planetary gear.

This problem is solved by an individual wheel drive according to the preamble of the main claim and having the characteristic features thereof.

According to the invention, the individual wheel drive for a vehicle comprises at least one planetary gear with one sun gear, one ring gear and one planet carrier. The planet carrier drives a wheel hub on which is fastened a single or dual wheels. Wheel bearings rotatably support said wheel hub. The individual wheel drive, according to the invention, in addition comprises one brake, one brake caliper and one brake-actuating device. A prime mover or a bunched up input of several engines produces the input power. The shaft of the prime mover or of the bunched up input by several engines is offset with respect to the wheel axle in order to design optimally the whole space required by the input and the brake-actuating device so that the wheel well affects the interior of the vehicle as little as possible. Said axle offset is again compensated in the planetary gear by offsetting the axle of the sun gear from that of the ring gear 15 and planet carrier 16 respectively. The axle of the ring gear coincides with the wheel hub and thus with the wheel axle.

In an advantageous development of the invention, planetary wheels of different diameters grip the sun gear and the ring gear. An offset between the axles of sun gear and the ring gear and planet carrier respectively thereby results. Said planetary gear can have, for example, two planetary wheels of different diameters. In another embodiment, it contains three planetary wheels of different diameters. From a technically logical point of view, said embodiment is, of course, possible only for a small axle offset. At the same time, in a symmetrical arrangement, two of the three planetary wheels can have the same diameter. Embodiments with more than three planetary wheels are also conceivable.

In this individual wheel drive the input is preferably electric. A possible use is in driven rear wheels combined with rigid axle systems for dual or single tires.

In an advantageous embodiment of the invention, the input power of a large electromotor is distributed over several smaller ones. Their respective input power is concentrated by a spur-gear collective drive. The individual, smaller electromotors are axially short so that the whole driving unit projects less in the direction of the interior of the bus. The through width of the interior of the vehicle is thus increased to the height of the wheels with the same total width of the vehicle. The adaptation to the required wheel torque and the wheel speed is effected by the rear-mounted planetary gear. The spur gear of the spur-gear collective drive on the output side is preferably connected with the sun gear of the planetary gear by a gear intermediate shaft. The wheel bearing, which rotatably supports the wheel hub, is advantageously situated between the spur-gear collective drive and the planetary gear. The rims are secured to the wheel hub.

The prime mover(s) are preferably cooled by air, water, oil or other means.

In an advantageous design of the invention, an input from several engines can be separately controlled. This makes possible a greater effectiveness in the intermediate load area in comparison with a one-engine individual wheel drive. The distribution of the input power of the individual wheel drive over several engines of less power which are made shorter than engines of stronger power offers, together with the reduction of the total length of the individual wheel drive, still other advantages: in the case of failure of a prime mover in the wheel head, operation via the remaining engines is still possible. In addition, advantages in cost result by using engines which are in the performance class of prime movers of passenger cars and can thereby be mass produced.

In an advantageous development of the invention, the brake of the individual wheel drive is designed as a pneumatically or hydraulically actuated disc brake and, in the same manner, acts as a service, parking, emergency or auxiliary brake.

The brake caliper is preferably placed beneath the horizontal central line of the wheel. It is advantageously in a circular section between 150° and 210°, the normal vector of the circular disc pointing in the direction of the wheel axle and the angle being measured by the radius vector pointing vertically upward, that is, in direction of the vehicle vertical axle. The brake-actuating device is here designed as a combined diaphragm and spring-accumulator cylinder. It is situated in a hollow axle body in an axle direction. The assembled wheel head is protected against impact by its position within the hollow axle body.

The parking brake advantageously has an emergency release device which is accessible from below through a handhole in the axle body. In the case of failure of the vehicle's own pressurized air, said emergency release device must be used in order to render towing of the vehicle possible.

Embodiments of the invention are shown in the drawings. They are:

FIG. 1 is a section through an individual wheel drive with several engines, one spur-gear collective drive which combines their input power, the axle of the spur-gear collective drive being offset relative to the wheel axle, and one planetary gear which, by means of its planetary wheels of different diameters and its sun gear connected with the spur-gear collective drive by an eccentrically mounted gear intermediate shaft, compensates for the axle offset between spur-gear collective drive and wheel axle;

Figure 1:
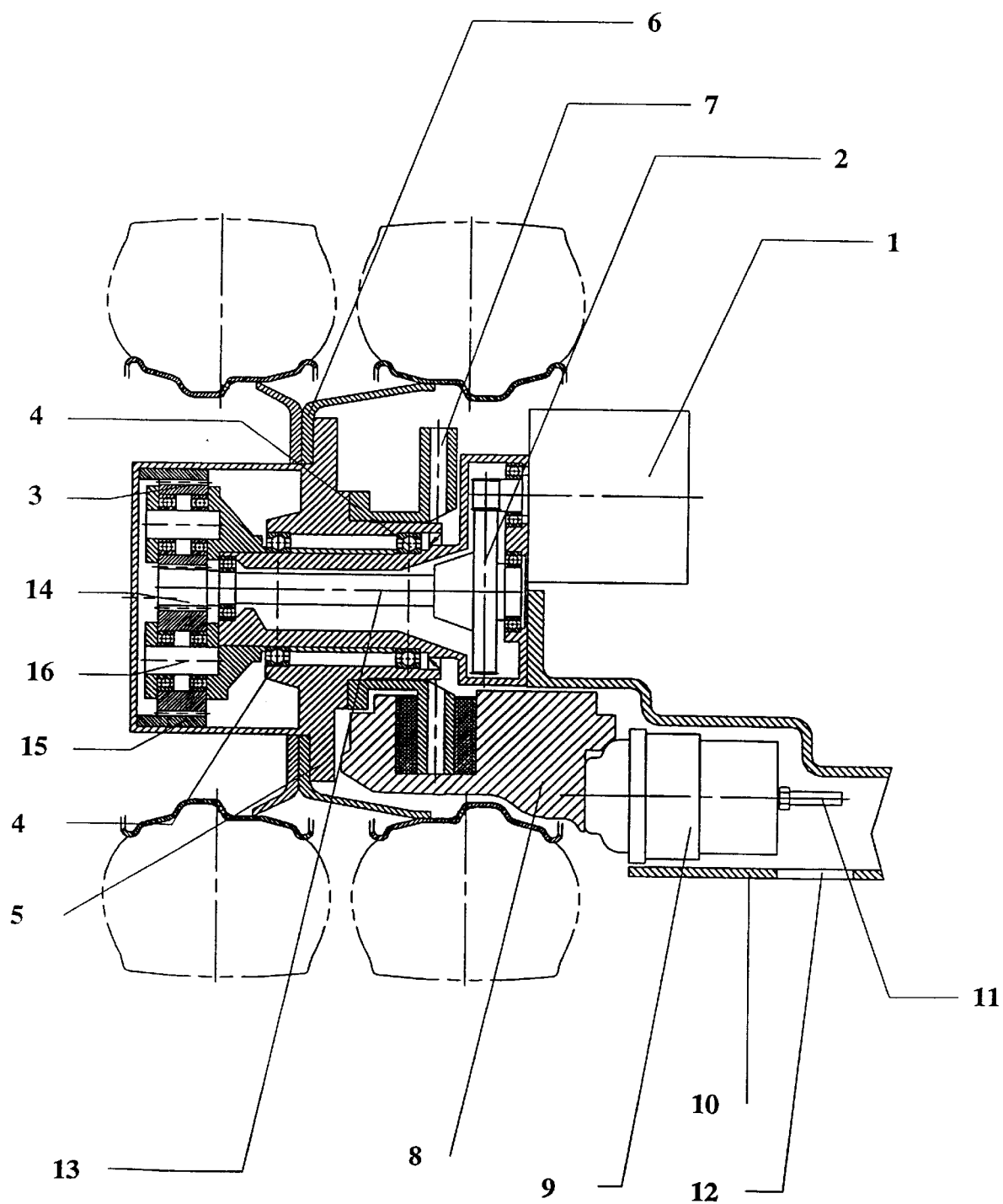
Figure 2:
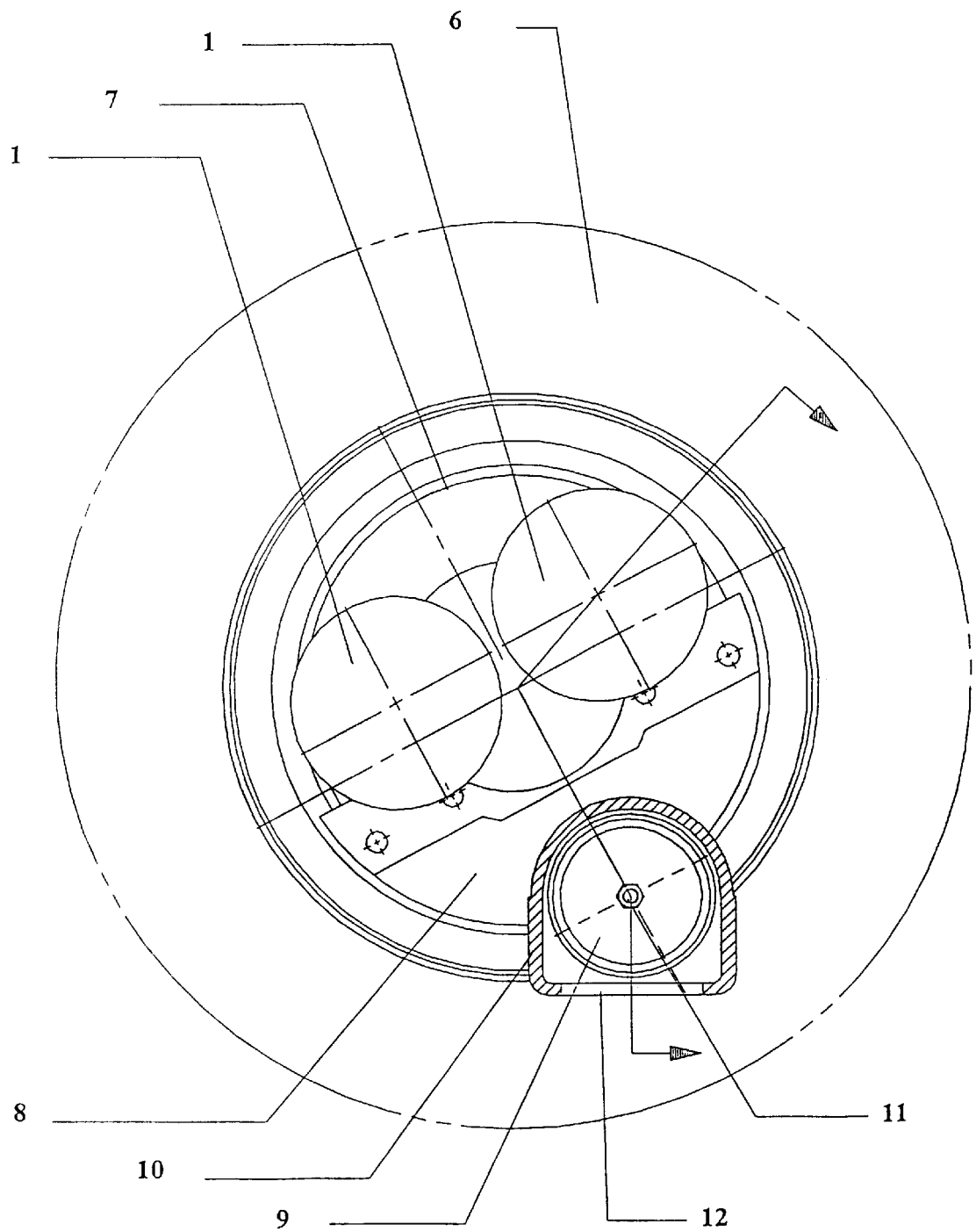
FIG. 2 is a section perpendicular to the wheel axle through an individual wheel drive with two eccentrically situated engines and with one disc brake arrangement in which the brake-actuating device is situated in a hollow axle body in an axle direction.
Figure 3:
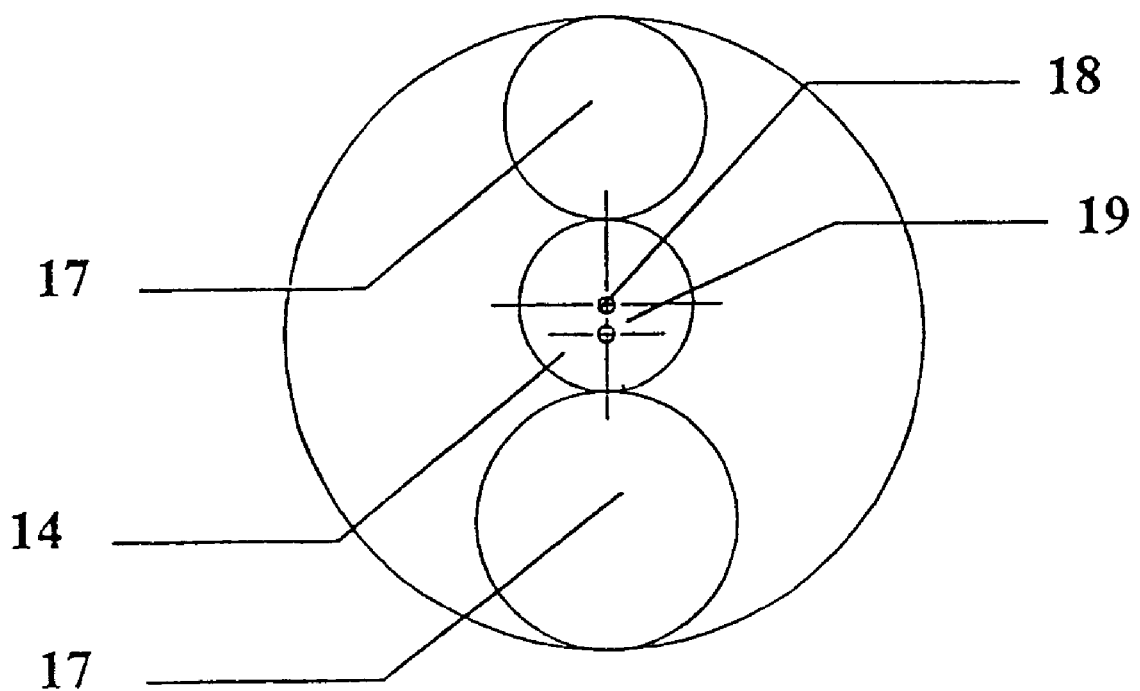
FIG. 3 is a diagrammatical partial section through a planetary gear with two planetary wheels of different diameter and one eccentrically supported sun gear.
Figure 4:
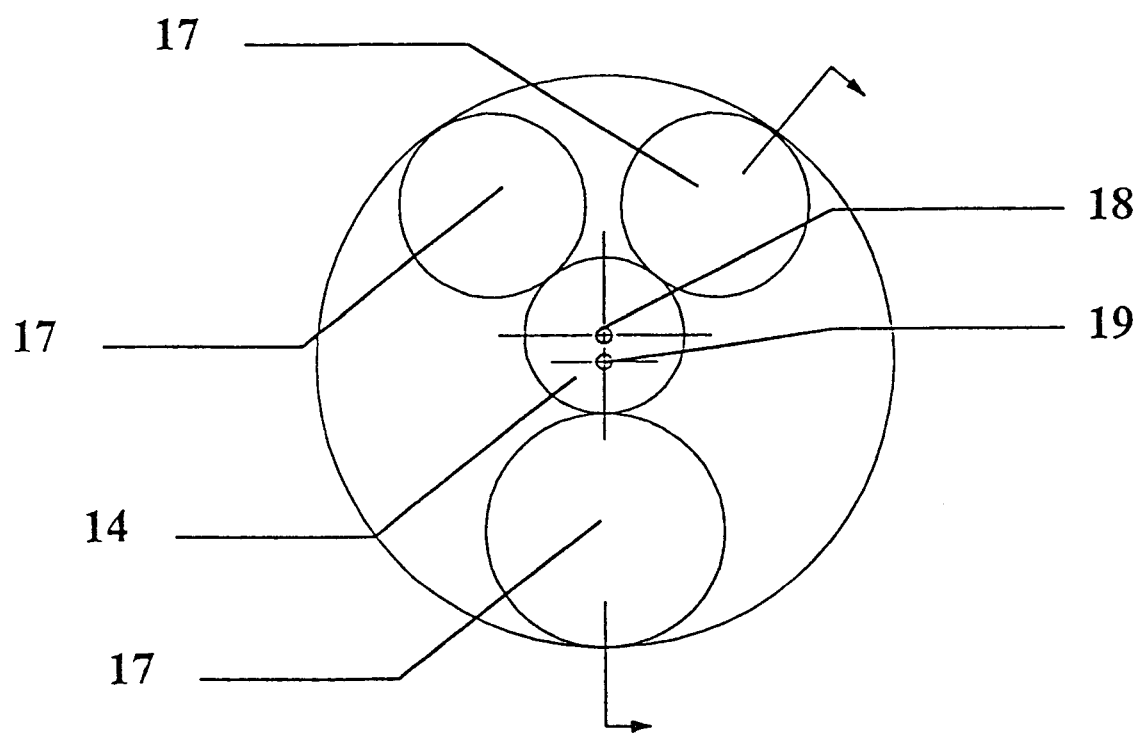
Figure 5:
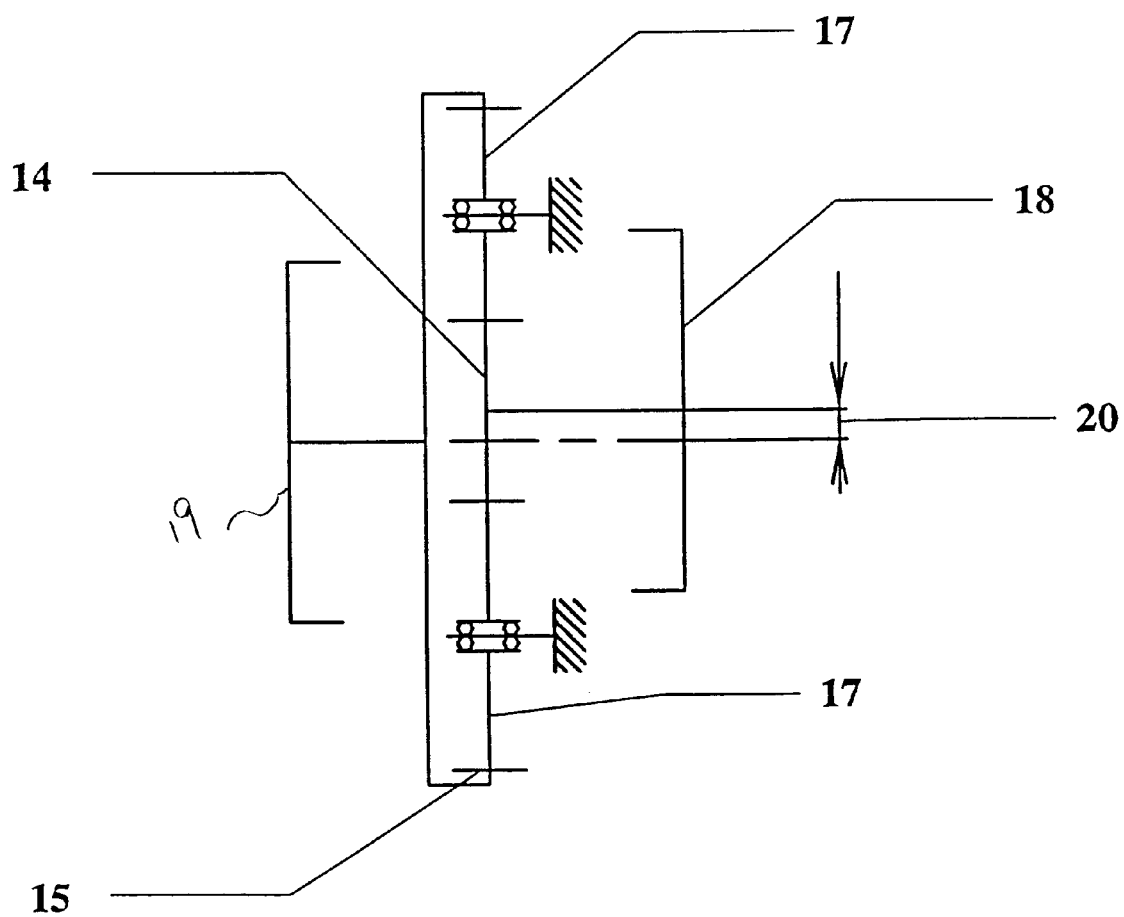

FIG. 4 is a diagrammatical partial section through a planetary gear with three planetary wheels of which two have the same diameter and another has a different diameter and an eccentrically supported sun gear; and FIG. 5 is a diagrammatical section through a planetary gear with two planetary wheels of different diameters and one eccentrically supported sun gear in which the axle of the wheel lies in the section of plane.

In one embodiment of the invention, two prime movers 1 drive a spur-gear collective drive 2 which is connected by a gear intermediate shaft 13 with the sun-gear 14 of a planetary gear 3. The axle of the spur-gear collective drive 2, which coincides with the axles of the gear intermediate shaft 13 and of the sun gear 14, is shifted around an axle offset 20 in relation to the axle of the ring gear 15 and planet carrier 16 respectively which coincides with the axle of the wheel hub 5 and thus the axle of the wheel. The planetary gears 17 have different diameters so that the sun gear 14 lies eccentrically in relation to the ring gear 15 and planet carrier 16 respectively. The ratio of the number of teeth of the planetary wheels 17 of different diameters is measured so that the eccentric position of the sun gear 14 that results therefrom, that is, of the input 18 in relation to the output 19, precisely corresponds to the axle offset 20. The planet carrier 16 of the planetary gear 3 is stationary. The ring gear 15 drives two tire rims 6 via a wheel hub. The wheel bearing 4, which rotatably supports the wheel hub 5, is axially mounted between the spur-gear collective drive 2 and the planetary gear 3. A brake 7, preferably designed as pneumatically actuated disc brake, carries out the functions of a service, parking, emergency and auxiliary brake. The brake caliper 8 is situated below the horizontal central line of the wheel. It is in a circle section between 150° and 210°, the normal vector of the circular disc pointing in the direction of the wheel axle and the angle being measured by a radius vector pointing vertically upward, that is, in the direction of the high axle of the vehicle. The brake-actuation 9 is designed as a combined diaphragm and spring accumulator cylinder which is situated in an axle direction and when the wheel head is assembled it is protected by a hollow axle body 10. In a technical variant of this, the brake 7 is hydraulically actuated. An emergency release device 11 of the parking brake, which in the case of failure of the vehicle own pressurized air system makes possible towing of the vehicle, is accessible from below through a handhole 12 of the axle body 10.

REFERENCE NUMERALS 1 prime mover
2 spur-gear collective drive
3 planetary gear
4 wheel bearing
5 wheel hub
6 rims
7 brake
8 brake caliper
9 brake actuation
10 axle body
11 emergency release device
12 handhole
13 gear intermediate shaft
14 sun gear
15 ring gear
16 planet carrier
17 planetary wheel
18 input
19 output
20 axle offset

What is claimed is:

1. An individual wheel drive for a vehicle having at least one prime mover (1) for supplying input drive to planetary gear set, said planetary gear set comprising at least one planetary gear (3) being rotated by a sun gear (14) supported by a sun gear axle, the at least one planetary gear (3) engaging with a ring gear (15), and a planet carrier (16) supporting the at least one planetary gear (3), the planetary gear set being located within a wheel hub (5), and the wheel hub (5) having a wheel bearing (4) to facilitate rotation of the wheel hub (5), and the wheel hub (5) further having a brake (7) having an associated brake caliper (8), and the brake caliper (8) being coupled to a brake-actuating device (9) to stop rotation of the wheel hub (5), wherein the axle of said sun gear (14) is offset with respect to a rotational axis of said planet carrier (16) and a rotational axis of said wheel hub (5).

2. The individual wheel drive according to claim 1, wherein there are at least two planetary gears (17) of different diameters which mesh with said sun gear (14) and said ring gear (15) so as to produce the axle offset (20).

3. The individual wheel drive according to claim 1, wherein the input drive to planetary gear set is provided by an electric motor.

4. The individual wheel drive according to claim 1, wherein an input power of several prime movers (1) is combined by a spur-gear collective drive (2) and provided as the input drive to planetary gear set.

5. The individual wheel drive according to claim 4, wherein said at least one prime mover (1) is coupled to be cooled by one of an air, a water, and an oil cooling device.

6. The individual wheel drive according to claim 4, wherein each of said several prime movers (1) is a separately controlled prime mover.

7. The individual wheel drive according to claim 4, wherein a spur gear on the output side of the spur-gear collective drive (2) is connected with said sun gear (14) of said planetary gear set by a gear intermediate shaft (13).

8. The individual wheel drive according to claim 7, wherein said wheel bearing (4) is situated axially between said spur-gear collective drive (2) and said planetary gear set.

9. The individual wheel drive according to claim 1, wherein said brake (7) is designed as one of a pneumatically and a hydraulically actuated disc brake and also acts as at least one of a service, a parking, an emergency and an auxiliary brake.

10. The individual wheel drive according to claim 1, wherein said brake caliper (8) is situated below a horizontal central line of the wheel and the brake actuation device (9) is a combined diaphragm and spring-accumulation cylinder and is situated in a hollow axle body in an axle direction.

11. The individual wheel drive according to claim 9, wherein said parking brake is coupled to an emergency release device (11) which is accessible from below through a hand hole (12) in said axle body (10).

* * * * *